US00RE49554E

(19) United States
(12) Reissued Patent
Jacoby et al.

(10) Patent Number: US RE49,554 E
(45) Date of Reissued Patent: Jun. 20, 2023

(54) CONTROL DEVICE

(71) Applicant: Lutron Technology Company LLC, Coopersburg, PA (US)

(72) Inventors: Elliot G. Jacoby, Glenside, PA (US); Jason C. Killo, Emmaus, PA (US); Brad Michael Kreschollek, Bethlehem, PA (US)

(73) Assignee: Lutron Technology Company LLC, Coopersburg, PA (US)

(21) Appl. No.: 29/827,327

(22) Filed: Feb. 18, 2022

Related U.S. Patent Documents

Reissue of:
(64) Patent No.: Des. 807,763
Issued: Jan. 16, 2018
Appl. No.: 29/578,773
Filed: Sep. 23, 2016

U.S. Applications:
(63) Continuation of application No. 29/695,315, filed on Jun. 18, 2019, now Pat. No. Re. 48,936, which is an
(Continued)

(51) LOC (14) Cl. ..... 10-04
(52) U.S. Cl.
USPC ..... D10/50; D13/162.1; D13/164
(58) Field of Classification Search
USPC ..... D13/162.1, 164; D10/49, 50
(Continued)

(56) References Cited

U.S. PATENT DOCUMENTS 4,316,256 A 2/1982 Hendricks et al.
4,780,573 A 10/1988 Own
(Continued)

OTHER PUBLICATIONS

Danalite Intelligent Light Pty Ltd., Light News, Aug. 2005, 8 pages, issue 2.
(Continued)

*Primary Examiner* — Philip S Hyder
(74) *Attorney, Agent, or Firm* — Saidman DesignLaw Group, LLC

(57) CLAIM

We claim the ornamental design for a control device, as shown and described.

DESCRIPTION

*This application is a continuation reissue of prior pending U.S. application Ser. No. 29/695,315, which is an application for reissue of U.S. Pat. No. D. 807,763, which issued from prior U.S. application Ser. No. 29/578,733, filed Sep. 23, 2016, which is a continuation of prior U.S. application Ser. No. 29/515,922, filed Jan. 28, 2015, now U.S. Pat. No. D. 769,829, issued Oct. 25, 2016; the entireties of which are expressly incorporated by reference herein.*

Figure 1:
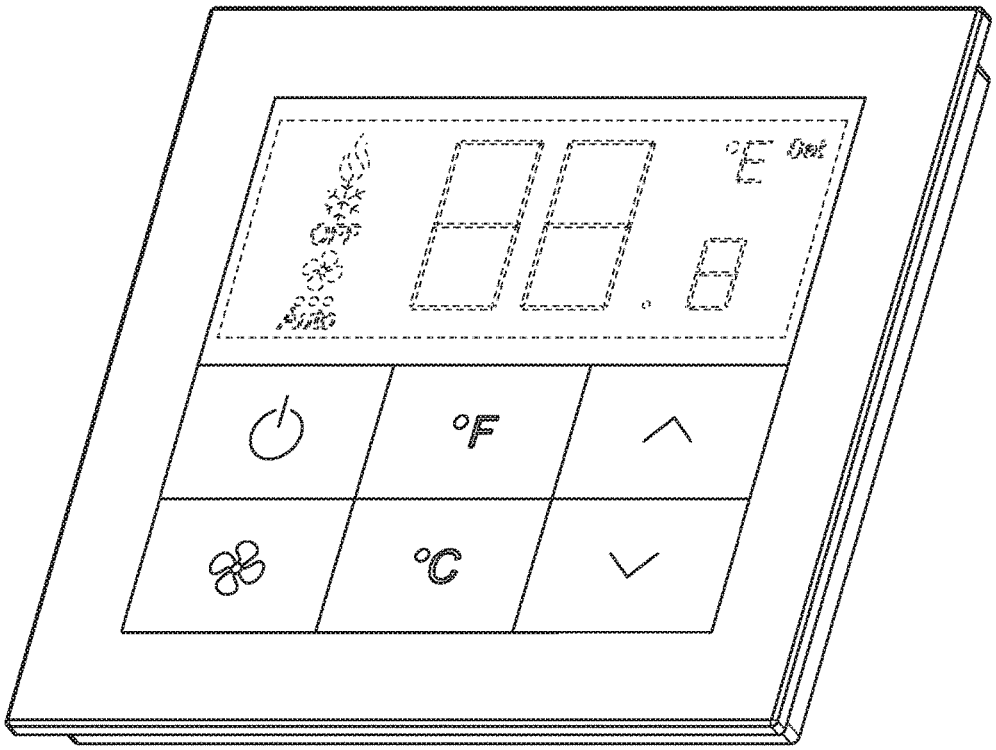
Figure 2:
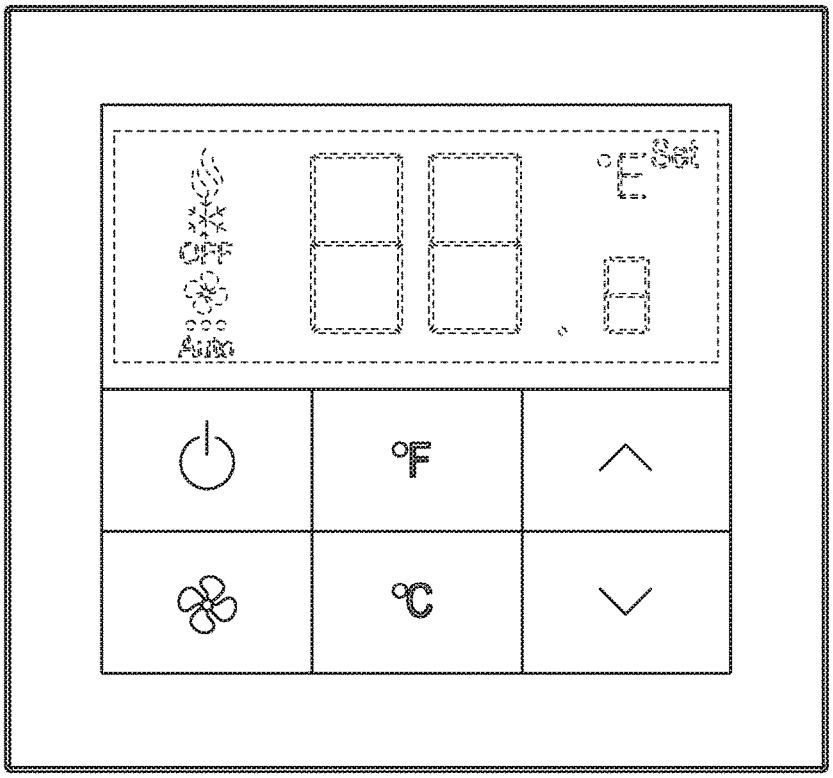
Figure 3:
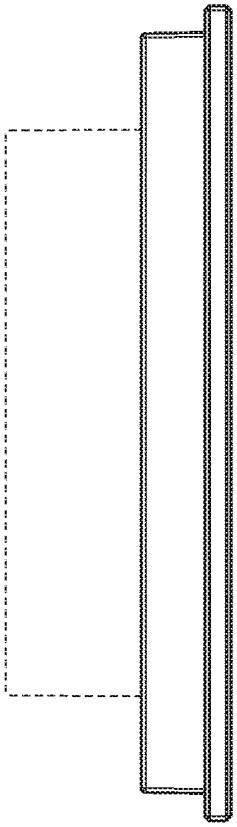
Figure 4:
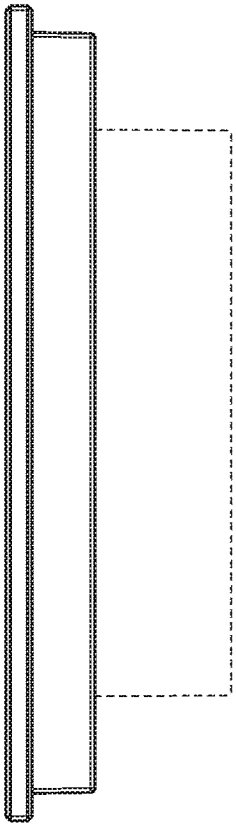
Figure 5:
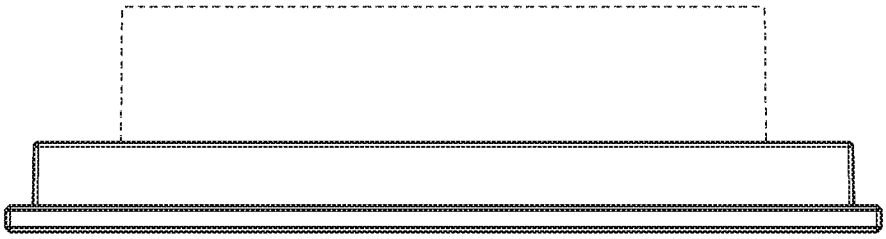
Figure 6:
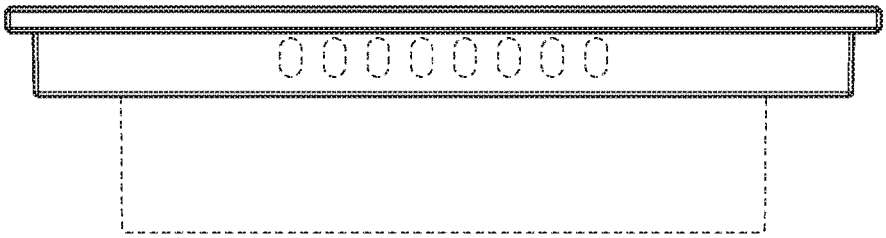

FIG. 1 is a perspective view of a control device showing our new design.
FIG. 2 is a front view thereof.
FIG. 3 is a left side view thereof.
FIG. 4 is a right side view thereof.
FIG. 5 is a top view thereof; and,
FIG. 6 is a bottom view thereof.

The rear [views] *view* forms no part of the design and is omitted. The portions of the drawings appearing in broken lines are for environment only and do not form part of the claimed design.

1 Claim, 8 Drawing Sheets

Matter enclosed in heavy brackets [ ] appears in the original patent but forms no part of this reissue; matter printed in italics indicates the additions made by reissue.

CANCELLED

Amended

Related U.S. Application Data application for the reissue of Pat. No. Des. 807,763, which is a continuation of application No. 29/515,922, filed on Jan. 28, 2015, now Pat. No. Des. 769,829.

(58) Field of Classification Search

CPC . F23N 5/20; F23N 5/203; F23N 5/206; F23N 2025/12; F23N 2041/02; F24F 11/00; F24F 11/001; F24F 11/0009; F24F 11/0012; F24F 2011/0057; F24F 2011/0073; F24F 2011/0091; G05D 23/1917; H05B 37/02; H05B 37/0245; H01H 9/02; H01H 9/16; H01H 9/161; H01H 9/165; H01H 9/181; H01H 9/182; H01H 2009/187

See application file for complete search history.

(56) References Cited

U.S. PATENT DOCUMENTS

| | | | | | |
|---|---|---|---|---|---|
| D309,268 | S | | 7/1990 | Wada et al. | |
| D310,340 | S | | 9/1990 | Wada et al. | |
| D316,681 | S | * | 5/1991 | Takasuna | D10/49 |
| D320,410 | S | | 10/1991 | Gotham | |
| D364,350 | S | | 11/1995 | Pasquarette et al. | |
| D364,573 | S | | 11/1995 | Pearsall | |
| 6,260,765 | B1 | | 7/2001 | Natale et al. | |
| D453,742 | S | | 2/2002 | Butler et al. | |
| D466,090 | S | | 11/2002 | Bennett et al. | |
| D547,273 | S | | 7/2007 | Mierta et al. | |
| D549,710 | S | | 8/2007 | Hynecek et al. | |
| D588,035 | S | | 3/2009 | Schmalz et al. | |
| 7,566,996 | B2 | | 7/2009 | Altonen et al. | |
| D623,606 | S | * | 9/2010 | Nakai | D13/168 |
| D633,448 | S | | 3/2011 | Biery et al. | |
| D642,992 | S | * | 8/2011 | Sasaki | D13/164 |
| D646,185 | S | * | 10/2011 | Edgar | D10/50 |
| D649,123 | S | | 11/2011 | Jacoby et al. | |
| D649,124 | S | | 11/2011 | Jacoby et al. | |
| D649,520 | S | | 11/2011 | Jacoby et al. | |
| D666,927 | S | * | 9/2012 | Krumpe | D10/50 |
| D678,223 | S | | 3/2013 | Wisniewski et al. | |
| D686,167 | S | | 7/2013 | Wisniewski et al. | |
| 8,525,372 | B2 | | 9/2013 | Huang | |
| D690,661 | S | * | 10/2013 | Wisniewski | D13/162 |
| D694,195 | S | * | 11/2013 | Gammon | D13/162 |
| D706,729 | S | | 6/2014 | Joshi et al. | |
| D706,731 | S | | 6/2014 | Altonen et al. | |
| D706,732 | S | | 6/2014 | Altonen et al. | |
| D707,186 | S | | 6/2014 | Sloan | |
| D707,191 | S | | 6/2014 | Altonen et al. | |
| D714,234 | S | | 9/2014 | Altonen et al. | |
| D717,742 | S | | 11/2014 | Larkin et al. | |
| D720,306 | S | | 12/2014 | Altonen et al. | |
| 8,978,994 | B2 | | 3/2015 | Moore et al. | |
| D734,277 | S | | 7/2015 | Jacoby et al. | |
| D737,154 | S | | 8/2015 | Jacoby et al. | |
| 9,119,240 | B2 | | 8/2015 | Nagazoe | |
| D738,229 | S | * | 9/2015 | Jiang | D10/50 |
| D738,753 | S | * | 9/2015 | Edgar | D10/50 |
| 9,124,130 | B2 | | 9/2015 | Altonen et al. | |
| 9,157,647 | B2 | | 10/2015 | Leen et al. | |
| 9,167,666 | B1 | | 10/2015 | Billheimer et al. | |
| D742,335 | S | * | 11/2015 | Yamaguchi | D10/49 |
| D750,981 | S | * | 3/2016 | Jacoby | D10/50 |
| D768,582 | S | | 10/2016 | Jacoby et al. | |
| D770,393 | S | | 11/2016 | Jacoby et al. | |
| D775,975 | S | * | 1/2017 | Jacoby | D10/50 |
| D775,976 | S | * | 1/2017 | Jacoby | D10/50 |
| D780,699 | S | | 3/2017 | Zhang | |
| D784,168 | S | * | 4/2017 | Jacoby | D10/50 |
| D797,684 | S | | 9/2017 | Poulheim et al. | |
| D809,943 | S | | 2/2018 | Jacoby et al. | |
| D834,535 | S | | 11/2018 | Poulheim et al. | |
| D835,051 | S | | 12/2018 | Poulheim et al. | |
| 2011/0253516 | A1 | | 10/2011 | Figueroa et al. | |
| 2012/0091213 | A1 | | 4/2012 | Altonen et al. | |
| 2013/0285472 | A1 | | 10/2013 | Bull | |
| 2014/0184418 | A1 | | 7/2014 | Maeda et al. | |
| 2014/0268630 | A1 | | 9/2014 | Samuels | |
| 2015/0076991 | A1 | | 3/2015 | Yamamoto et al. | |
| 2015/0316285 | A1 | | 11/2015 | Clifton et al. | |

OTHER PUBLICATIONS

BTicino Spa, Matix Brochure, May 2009, 16 pages.

Dynalite Intelligent Light Pty Ltd., Light News, Aug. 2005, 8 pages, issue 2.

Design U.S. Appl. No. 29/502,412, filed Sep. 16, 2014. (Unpublished).

Design U.S. Appl. No. 29/515,919, filed Jan. 28, 2015. (Unpublished).

Design U.S. Appl. No. 29/515,921, filed Jan. 28, 2015. (Unpublished).

Design U.S. Appl. No. 29/515,924, filed Jan. 28, 2015. (Unpublished).

* cited by examiner

CANCELLED

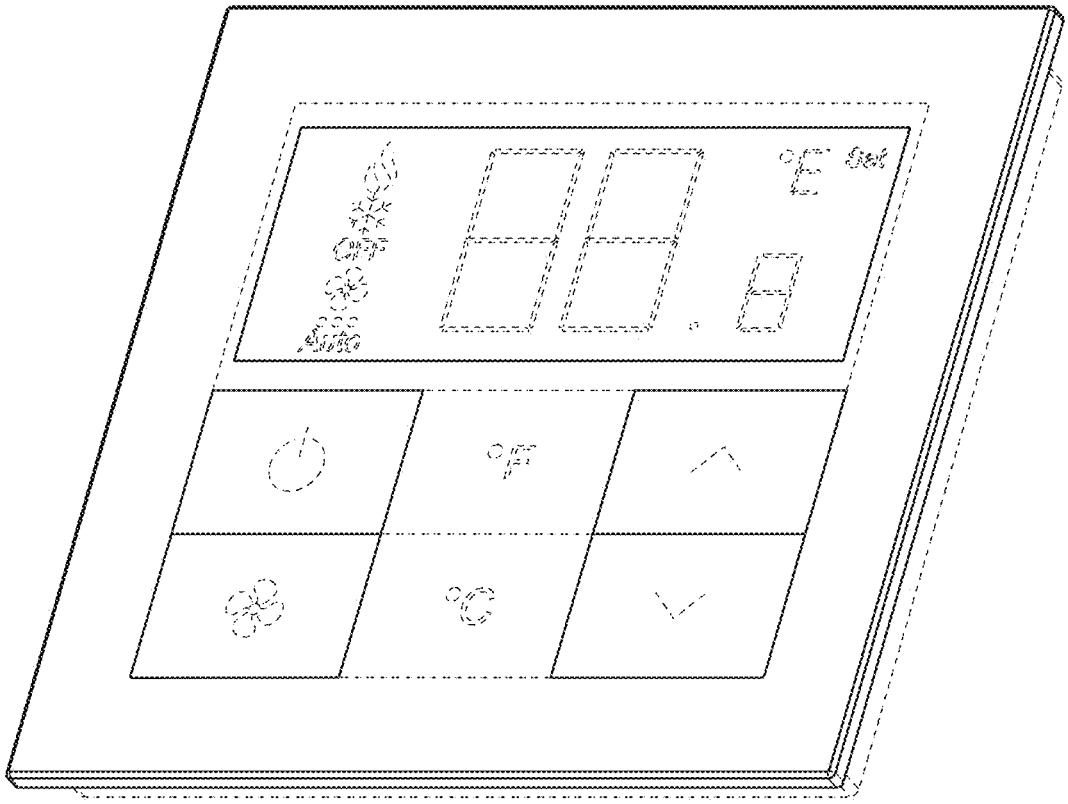
FIG. 1 Amended

CANCELLED

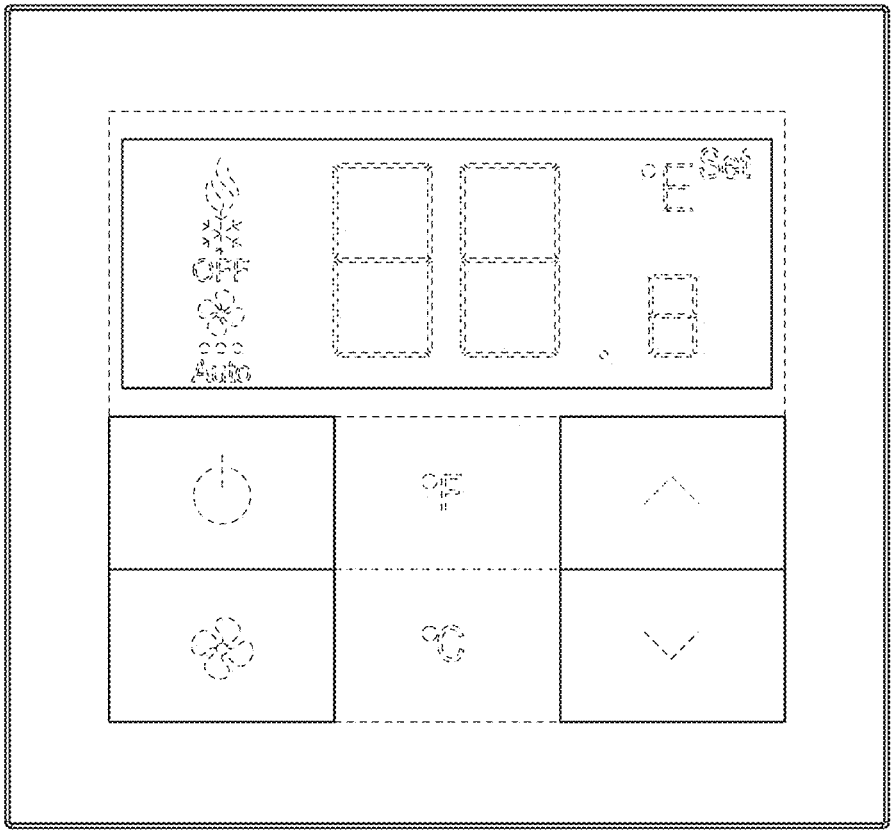
FIG. 2 Amended

CANCELLED

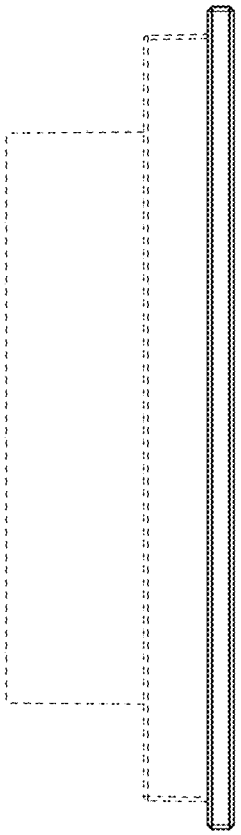
FIG. 3 Amended
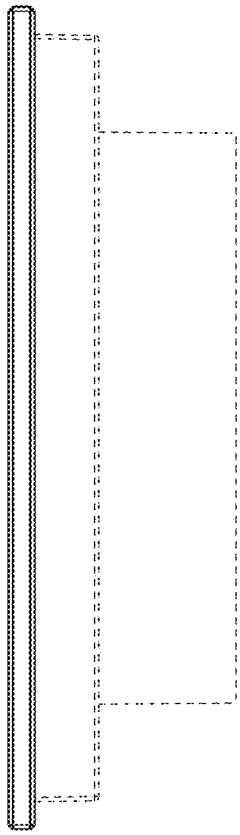
FIG. 4 Amended

CANCELLED

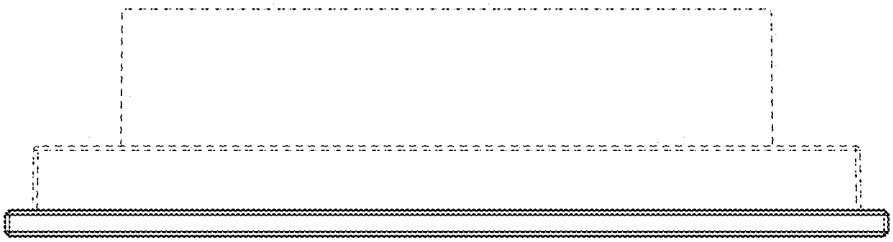
FIG. 5 Amended
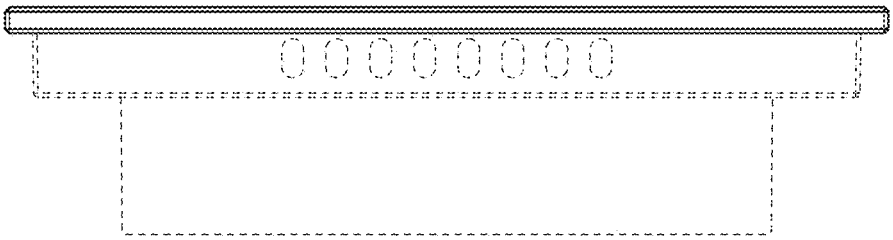
FIG. 6 Amended